UNITED STATES PATENT OFFICE.

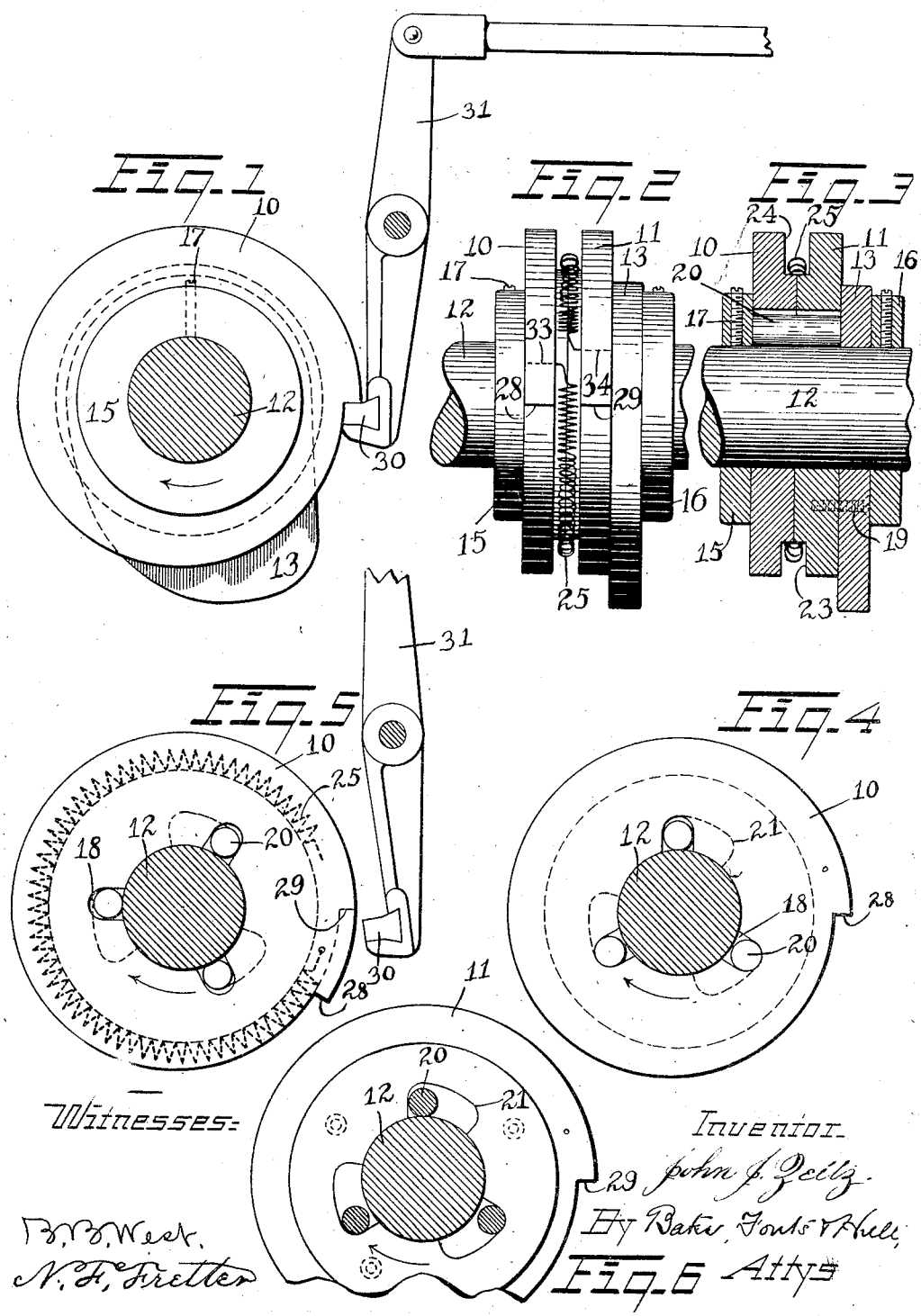

JOHN J. ZEITZ, OF CLEVELAND, OHIO, ASSIGNOR TO THE AMERICAN MULTIGRAPH COMPANY, OF CLEVELAND, OHIO, A CORPORATION OF OHIO.

FRICTION-CLUTCH.

No. 906,181.   Specification of Letters Patent.   Patented Dec. 8, 1908.

Application filed February 3, 1908. Serial No. 413,965.

*To all whom it may concern:*

Be it known that I, JOHN J. ZEITZ, a citizen of the United States, residing at Cleveland, in the county of Cuyahoga and State of Ohio, have invented a certain new and useful Improvement in Friction-Clutches, (Case 32,) of which the following is a full, clear, and exact description, reference being had to the accompanying drawings.

The object of this invention is to provide a very simple and efficient friction clutch adapted to automatically throw itself into engagement when released.

Another feature of the clutch is that it may automatically break such engagement whenever desired, as, for example, at the end of a complete rotation. The clutch is well adapted for periodically clutching a member to a continuously rotating shaft passing freely through it.

The invention consists of the means by which I attain the above ends, as hereinafter more fully explained and as set out definitely in the claims.

As shown in the drawing, Figure 1 is a side elevation of my clutch with a suitable releasing lever; Fig. 2 is an edge view of such clutch; Fig. 3 is a vertical section of the same; Fig. 4 is a side elevation adjacent to the outer face of the left hand clutch disk (as shown in Figs. 2 and 3) the clutch being disengaged; Fig. 5 is a similar view showing the clutch engaged; and Fig. 6 is a face view, partly broken away, of the clutch disk which is behind the disk shown in Figs. 4 and 5.

As shown in the drawings, 10 and 11 represent two disks placed side by side and loosely journaled on a shaft 12. Secured to one of these disks, as 11, is a suitable member which it is intended to periodically clutch to the shaft. This member is illustrated by the cam 13 secured by screws 19 to the member 11. The parts are prevented from longitudinal displacement by suitable collars 15 and 16 which are secured to the shaft by set screws 17.

The disk 10 is provided with one or more radially extending recesses 18 leading from the bore of the disk, three of these recesses being shown. These recesses are occupied by rollers 20 which extend parallel with the shaft across the two disks, the roller occupying the recess with sufficient freedom to prevent any binding. The disk 11 is provided with a similar number of recesses which such roller or rollers occupy, but these recesses, as indicated by 21 are arc-shaped, and are non-concentric with the shaft, the outer wall of the recess, while nearly concentric with the shaft, approaching it slightly.

The two disks have rabbeted edges 23 and 24, and in the annular groove thus provided there is a spring 25, one end of which is anchored, as at 33, to the disk 10 and the other end, as at 34, to the disk 11, the spring extending a convenient portion of the entire distance around the disks. As shown, the spring is a helix, which has been found satisfactory. The tension on this spring tends to turn the member 10 relatively to the member 11 so as to bring the rollers 20 from a portion of the recesses 21, where they are free from the shaft, into a portion of such recesses where they bind the shaft,—this movement thus causing the engagement of the clutch.

Each of the disks is provided with a shoulder, which may be at the periphery, as indicated at 28 and 29. When the clutch is disengaged, these two shoulders are side by side and are adapted to be retained in this position by any suitable stop, as, for example, the block 30 on a suitably operated lever 31, as shown in Fig. 1. When so held, the clutch structure is free from the shaft which revolves idly therein.

When it is desired to cause the clutch to engage, the two members are released, as, for example, by the swinging of the lever 31. When released, the spring advances the member 10 with reference to the member 11, twisting it on the shaft, as it were, and thus carrying the rollers into the constricted portion of the recess 21, as shown in Fig. 5. This binds the members to the shaft so that they rotate therewith.

In the embodiment shown in the drawing, the shaft rotates in the direction of the arrow. Whenever after the clutch has engaged, the member 30 is returned to initial position, the shoulder 28, at some point during that rotation, engages the block 30 which stops the rotation of that disk,—while the other disk advances to the corresponding position by reason of the friction drive of the shaft, and this movement brings the rollers into free portion of the recess 21, releasing the clutch. The spring 25 is strong enough to twist the disk 10 with reference to the disk 11 to cause the engagement, but is light enough so that the friction of the shaft in its constant rotation keeps the member 11 relatively advanced with the shoulder 29 against the stop 30. If immediately on the withdrawal of the member 30, it is returned by the reverse operation of the lever 31 so that it stands in the path of the shoulder 29, it causes the release of the clutch exactly at the end of the complete rotation. The clutch is thus well adapted for a single rotation clutch, for which there are a large variety of uses. The rollers 20 are retained against longitudinal displacement by suitable means, those shown being the collar 15 on one side and the driven member 13 on the other. The removal of the collar 15 thus allows access to the interior for oiling or cleaning.

My clutch is very simple and cheap in construction, and is especially compact. It causes very little friction when disengaged and, immediately upon release, binds the driven member to the shaft, and then, at the end of the rotation, or at such other point as desired, automatically disengages itself.

It is to be understood that the amount that the outer wall of the recess 21 is out of concentricity is very slight, so slight that it has been necessary to exaggerate it to clearly show it in the drawing. I have found, for example, that in a clutch somewhat smaller than that shown in the drawing, a hundredth of an inch variation between the deepest and the shallowest portions of the recesses 21 is sufficient to cause proper freedom at one end and binding at the other.

Having thus described my invention, I claim:

1. The combination, with a structure to be clutched, of a pair of members, and a clutching element under the influence of both of said members, one of said members having an engagement with said element which allows relative radial movement but restricts relative arcual movement, and the other member having an engagement with the element which allows relative arcual movement but restricts relative radial movement, whereby said element may be brought into clutching engagement with said structure.

2. The combination of a shaft, a pair of members mounted thereon side by side, a clutching roller extending across both of said members, one of said members having an engagement with said roller which allows relative radial movement but restricts relative arcual movement, and the other member having an engagement with the roller which allows relative arcual movement but restricts relative radial movement.

3. In a friction clutch, the combination of a member to be clutched, a pair of members side by side having overlapping recesses, one of which has a cam wall, a clutching member occupying both of said recesses and adapted to engage the member to be clutched, and a spring tending to move said members first mentioned, one with reference to the other, to cause the cam wall to act on said clutching member.

4. The combination of a pair of members adapted to be journaled on a shaft and having recesses leading from their bores, said recesses overlapping, a clutch member occupying such recesses, the recess in one of said members substantially confining said clutching member against relative arcual displacement, and the recess in the other member extending arcually but being constricted, whereby when one member moves relatively to the other, the common clutching member may be caused to bind the shaft.

5. In a clutch, the combination of a shaft, a pair of members loosely journaled thereon side by side, said members having recesses overlapping each other, rollers parallel with the shaft, occupying such recesses and extending crosswise of the members, the recesses in one member substantially confining the rollers against relative arcual movement, but the recesses in the other disk allowing such movement but adapted to constrain the rollers toward the shaft when so moved.

6. The combination of a pair of clutching disks side by side, a common clutching roller mounted within the two disks, one of said disks being adapted to move the roller arcually and the other radially consequent upon its arcual movement, and a spring tending to give one of said disks a partial rotation relative to the other.

7. The combination of a pair of clutching members, side by side, a common clutching roller mounted within the two members, one of said members being adapted to move the roller arcually and the other radially consequent upon its arcual movement, a spring tending to give one of said members a partial rotation relative to the other, a shoulder on one of said members, and a movable controlling stop adapted to engage said shoulder or be freed therefrom.

8. The combination of a shaft, a pair of disks loose thereon, said disks having rabbeted coöperating edges, a spring seating in the groove provided by such rabbets, said spring having one end secured to one disk and the other to the other and tending to twist said disks about the axis of the shaft, one with reference to the other, means for restraining such twisting, and means whereby such twisting clamps the disks to the shaft.

9. The combination of a shaft, a pair of disks loose thereon, a spring having one end secured to one disk and the other to the other and tending to twist said disks about the axis of the shaft, one with reference to the other, means for restraining such twisting, a clamping roller parallel with the shaft and adapted to engage the same and occupying recesses in both of said disks, one of said recesses allowing radial movement of the roller but constraining it arcually, and the other of said recesses allowing arcual movement but constraining it radially.

10. The combination of a shaft, a pair of disks loose thereon, said disks having rabbeted coöperating edges, a spring seating in the groove provided by such rabbets, said spring having one end secured to one disk and the other to the other and tending to twist said disks about the axis of the shaft, one with reference to the other, means for restraining such twisting, a clamping roller parallel with the shaft and adapted to engage the same and occupying recesses in both of said disks, one of said recesses serving to move the roller into position where the other recess binds it against the shaft.

11. The combination of a shaft, a pair of collars or other suitable members rigid thereon, a pair of disks loosely journaled on the shaft between said collars or members, rollers occupying recesses in said disks leading from their respective bores, said rollers being parallel with the shaft and held against longitudinal displacement by said collars or members, the recesses in one of the disks allowing the rollers radial movement, but constraining them against relative arcual movement, and the recesses in the other member allowing relative arcual movement of the rollers but constraining them radially, and a spring having its ends connected with said disks and tending to relatively twist them to cause said rollers to bind on the shaft.

12. The combination of a shaft, a pair of disks loosely journaled on the shaft between suitable members, rollers occupying recesses in said disks leading from their respective bores, said rollers being parallel with the shaft and held against longitudinal displacement by said members, the recesses in one of the disks allowing the rollers radial movement, but constraining them against arcual movement, and the recesses in the other member allowing relative arcual movement of the rollers but restraining them radially, a spring having its ends connected with said disks and tending to relatively twist them to cause said rollers to bind on the shaft, said disks being each provided with a suitable shoulder, and a member adapted to engage said shoulder and hold the disks against rotation.

13. In a clutch, the combination of four coöperating members, one of them being adapted to move the second around the third into position to cause the fourth to move the second inwardly against the third, the first and fourth members being side by side and the second member extending transversely of both.

14. In a clutch, the combination of four coöperating members, one of them being adapted to move the second around the third into position to cause the fourth to move the second inwardly against the third, the first and fourth members being side by side and the second member extending transversely of both, a spring tending to cause such movement, and means for restraining such action.

15. In a friction clutch, the combination of the four coöperating members, 10, 11, 12 and 20, the member 10 being adapted to move the member 20 into position to cause the member 11 to bind the member 20 against the member 12, the members 10 and 11 being journaled side by side around the member 12 and the member 20 extending transversely of the members 10 and 11 and between them and the member 12.

16. The combination with a shaft, of a pair of members side by side surrounding the shaft, a clutching member under the control of each of said pair of members and adapted to engage the shaft, one of said pair of members being formed with a cam surface, and means for imparting relative movement between that member and the clutching member.

17. The combination of a shaft, a pair of disks loosely surrounding the same, a roller under the influence of both disks and adapted to engage the shaft to clutch it to one of them, one of the disks having a cam surface, and means for imparting relative movement between such disk and the roller to effect the clutching action.

18. The combination of a member to be clutched, a pair of disks, a clutching member under the influence of both disks and adapted to engage the member to be clutched, one of the disks having a cam surface, and a spring having its ends attached to the disks respectively and adapted to move one of them to cause the clutching action.

19. The combination of a shaft, a pair of disks surrounding the shaft and loosely journaled thereon, a roller parallel with the shaft and occupying recesses in both disks, one of the disks having a cam surface adapted to bind the roller against the shaft, and a spring connected to the disks for giving them relative movement.

20. The combination of a shaft, a clutching member loosely surrounding the same and having a cam shaped recess, another member by the side of the clutching member, a spring attached at its ends to the two members mentioned, a roller adapted to engage the shaft to effect the clutching action, and means for restraining the action of the spring.

21. In a clutch, the combination with a shaft, of a disk loosely mounted concentric of the shaft, a roller interposed between the disk and shaft, and adapted to engage the shaft, a cam surface on the inner periphery of the disk contacting with the roller, a member for moving the roller about the shaft, and a spring adapted to actuate said member to produce relative rotary movement between the disk and roller without disturbing the presentation of the disk to the shaft.

22. In a clutch, the combination of a shaft, a pair of clutching members side by side, both rotary and loosely journaled on the shaft, a member adapted to bind the shaft and under the joint control of both members of said pair, and a spring having its ends secured to the members of the pair respectively and serving to shift one with reference to the other to effect the clutching action.

23. The combination with a shaft, of a pair of clutching disks mounted side by side and loosely journaled on the shaft, a spring located annularly about the shaft and occupying a recess provided by the disks and having one end secured to one disk and the other end to the other disk, and a clutching member between the disks and shaft and controlled by said spring.

24. In a clutch, the combination of a member to be clutched, a pair of rotary members mounted side by side, a member under the influence of both rotary members and adapted to engage the member to be clutched and thereby bind said rotary members thereto, a spring tending to twist one with reference to the other, means for preventing such action, and means whereby such action when allowed effects the clutching engagement.

25. In a clutch, the combination of a shaft, a pair of freely rotating disks mounted side by side, a spring tending to twist said disks one with reference to the other, and a clutching member under control of both disks and forced into clutching engagement with said shaft by such twisting movement.

26. The combination with a shaft, of a pair of clutching members freely journaled thereon side by side, a spring tending to twist said members one with reference to the other, and a third clutching member under the control of the two members mentioned and adapted to engage said shaft, one of such two members having a cam surface whereby when said twist takes place said third member is forced into clutching action with the shaft.

27. In a friction clutch, the combination of a member to be clutched, a pair of disks mounted side by side, a spring tending to twist said disks one with reference to the other, a clutching member under the influence of both disks and adapted to be moved into clutching engagement with the member to be clutched by such twist, a stop shoulder on each disk, and a movable member adapted to engage such shoulders and hold the disks idle or release them.

28. The combination of a shaft, a pair of disks freely journaled thereon, suitable means for preventing longitudinal shifting of the disks on the shaft, transverse openings in said disks contiguous to their bores, clutching rollers occupying said openings and under the influence of both disks, the openings in one of the disks having a cam shaped outer surface, a spring tending to twist said disks one with reference to the other, shoulders on the disks, and a movable stop member adapted to engage or release both shoulders.

29. The combination of a pair of clutching members side by side, a common clutching roller mounted in openings in the two members, one of the members being adapted to move the roller arcually and the other radially consequent upon its arcual movement, and means for giving one of said members a partial rotation with respect to the other.

30. In a clutch, the combination of clutch members side by side, a rotary shaft on which said members are journaled, and a clutch member common to the two members mentioned and adapted to be forced by their relative rotary movement into clutching engagement between one of said members and the shaft.

31. The combination with a shaft, of a pair of clutching members freely journaled thereon, one of said members having a cam slot, a roller occupying such cam slot and under the control of the other member, and means for moving the other member to carry the roller about the shaft into the confined portion of the slot to cause it to bind the shaft.

In testimony whereof, I hereunto affix my signature in the presence of two witnesses.

JOHN J. ZEITZ.

Witnesses:
  W. DUNLAP,
  ALBERT H. BATES.